March 21, 1967  J. J. BLACK  3,310,070
SELECTIVE VALVE ACTUATING MECHANISM FOR VESSELS
Original Filed April 21, 1961  10 Sheets-Sheet 1
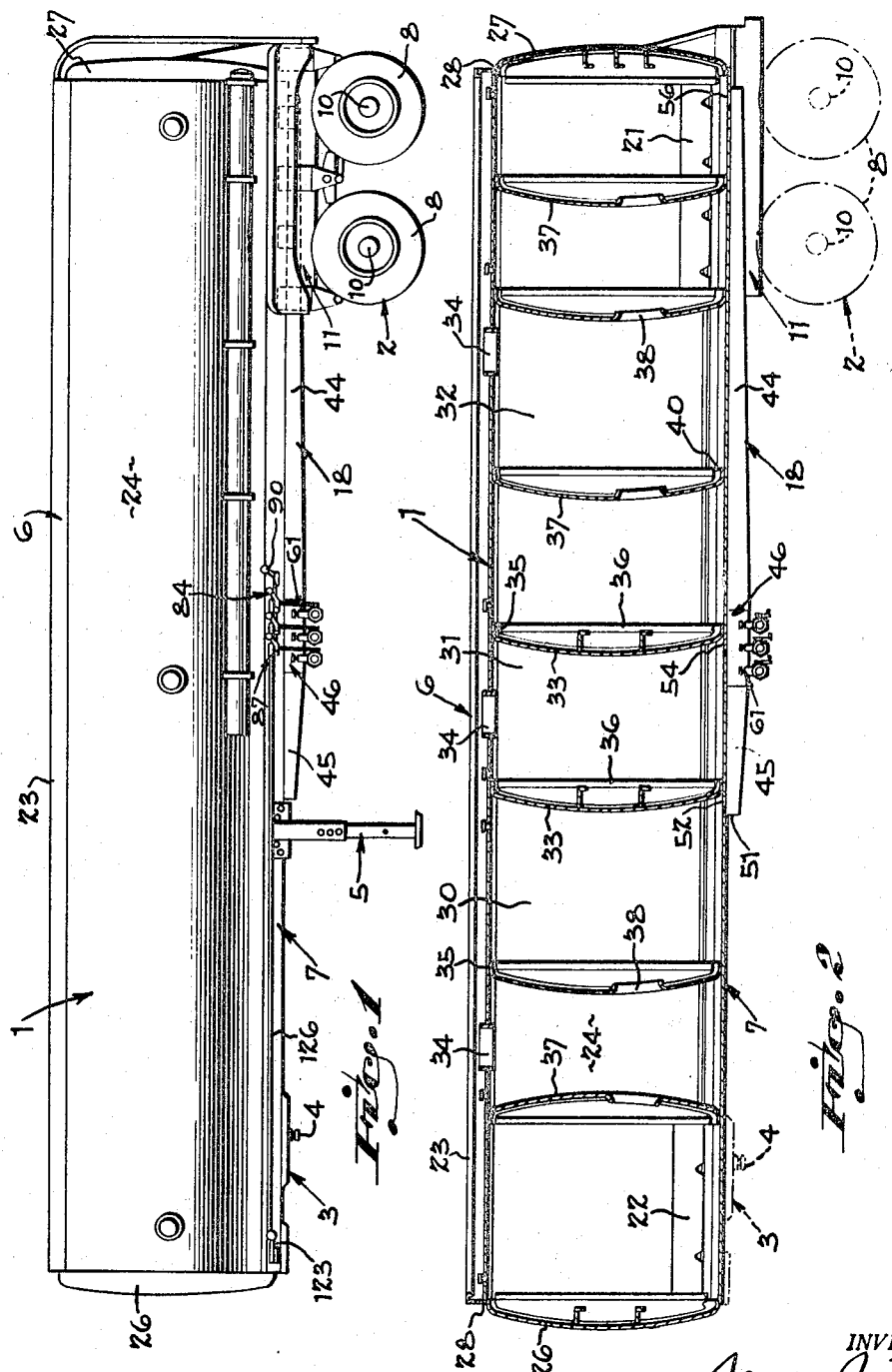
INVENTOR.
James J. Black.
BY
ATTORNEYS.

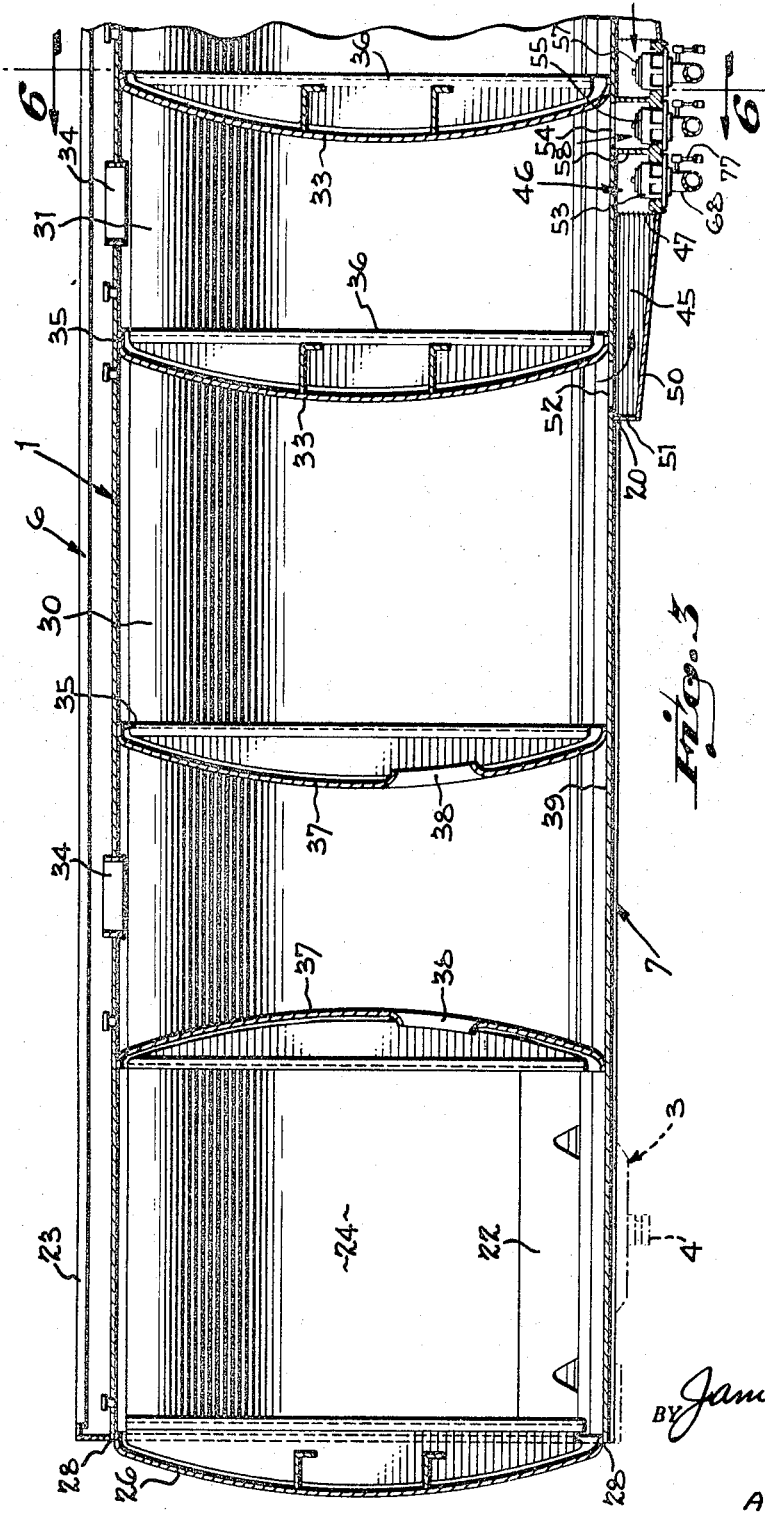

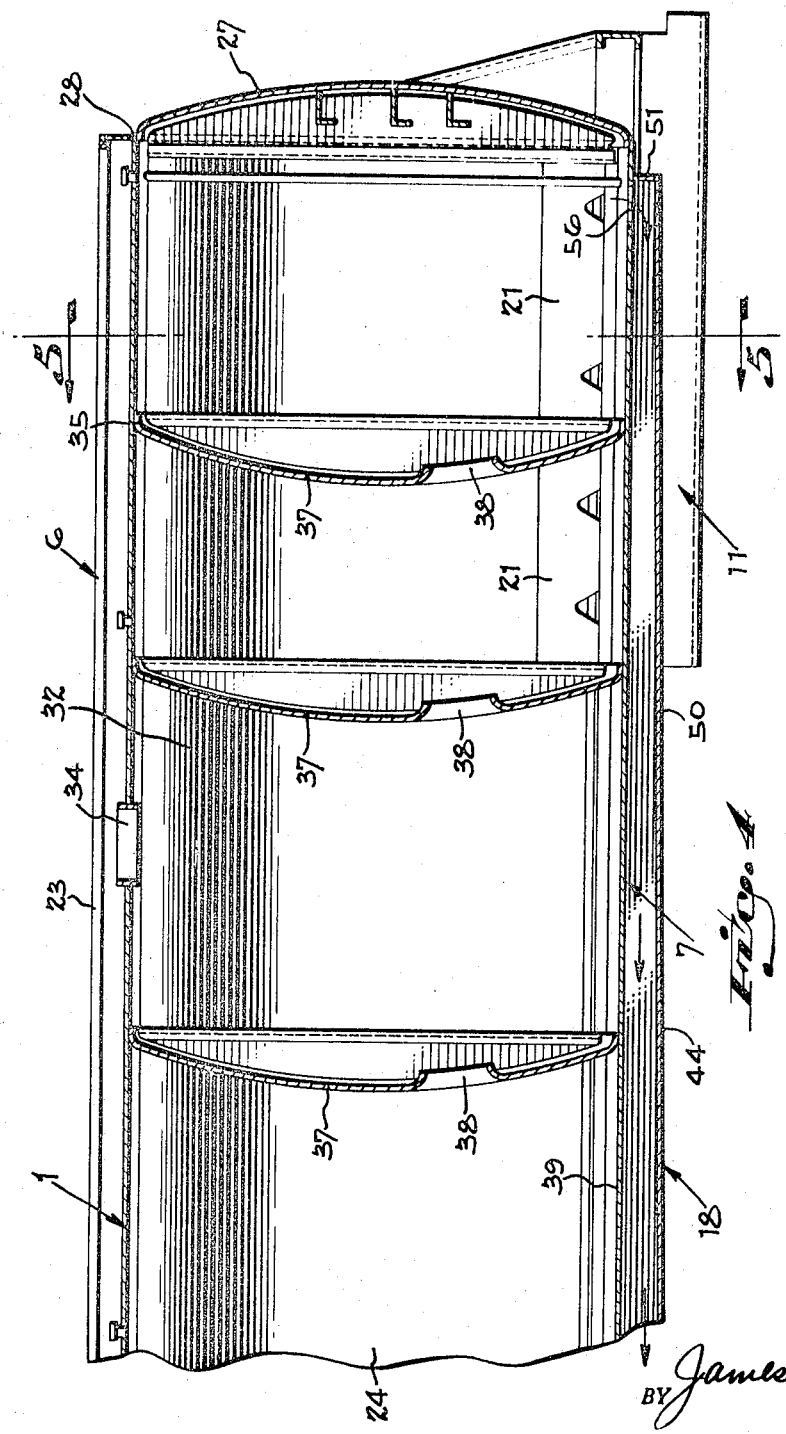

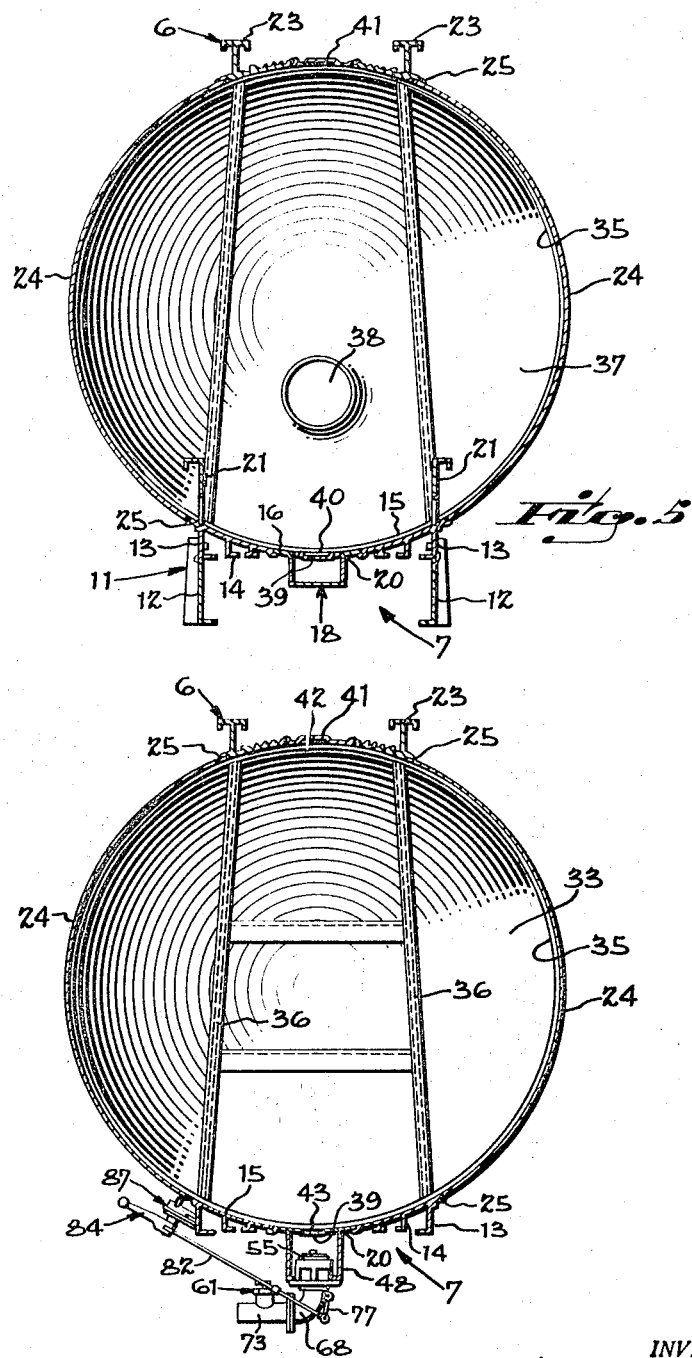

March 21, 1967  J. J. BLACK  3,310,070
SELECTIVE VALVE ACTUATING MECHANISM FOR VESSELS
Original Filed April 21, 1961  10 Sheets-Sheet 5

INVENTOR.
James J. Black.
BY
ATTORNEYS.

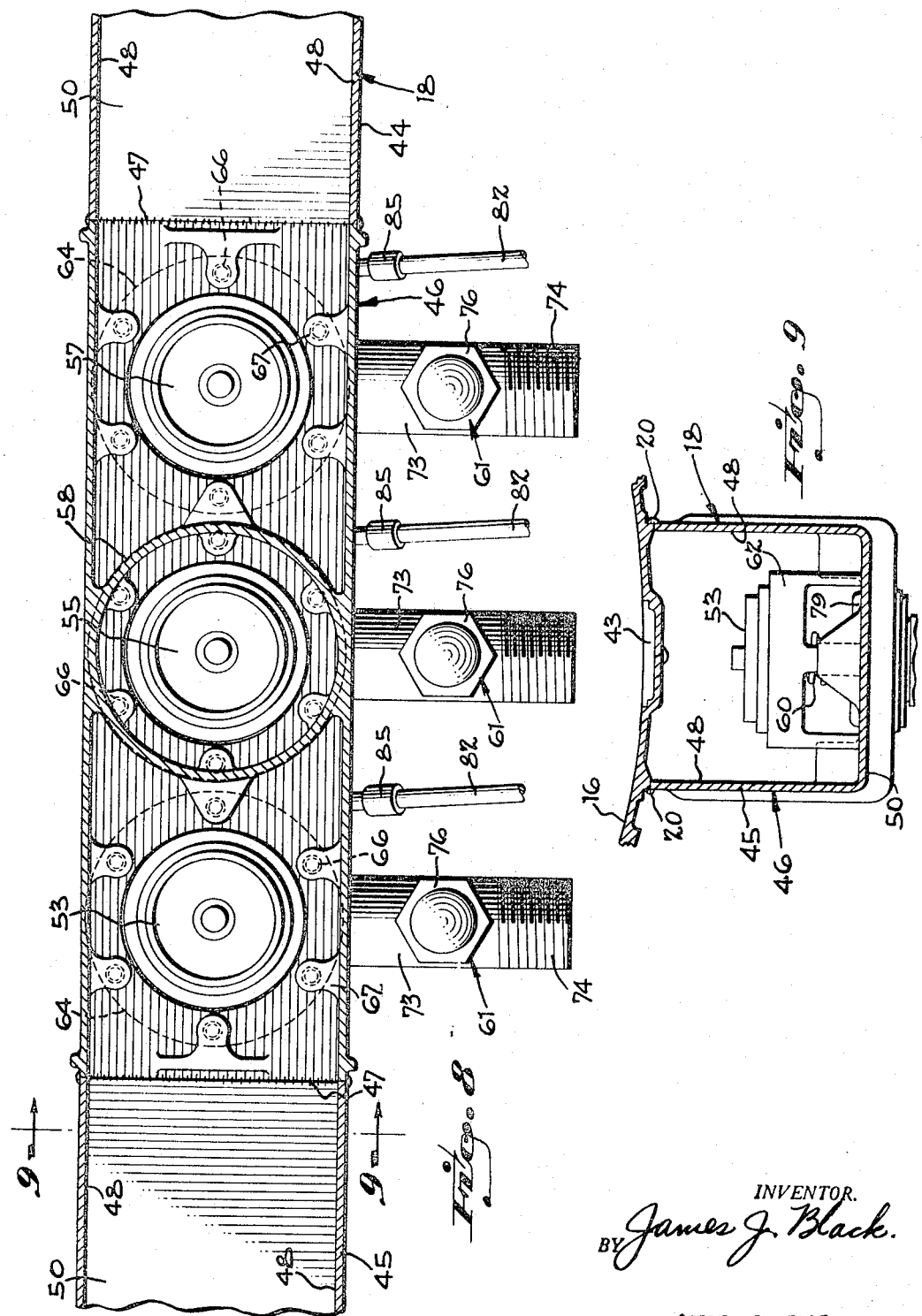

March 21, 1967 J. J. BLACK 3,310,070
SELECTIVE VALVE ACTUATING MECHANISM FOR VESSELS
Original Filed April 21, 1961 10 Sheets-Sheet 7

INVENTOR.
BY *James J. Black.*

ATTORNEYS.

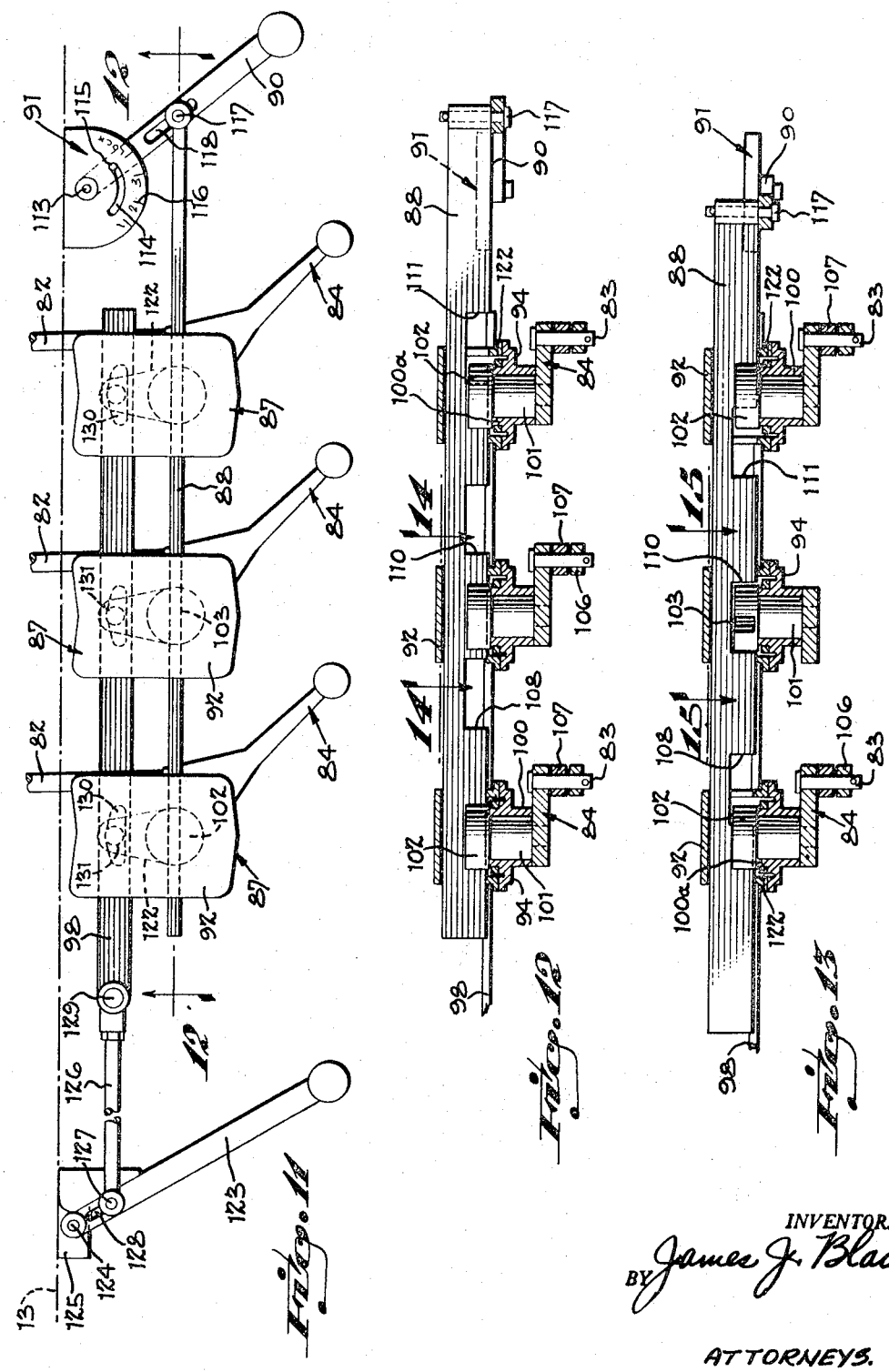

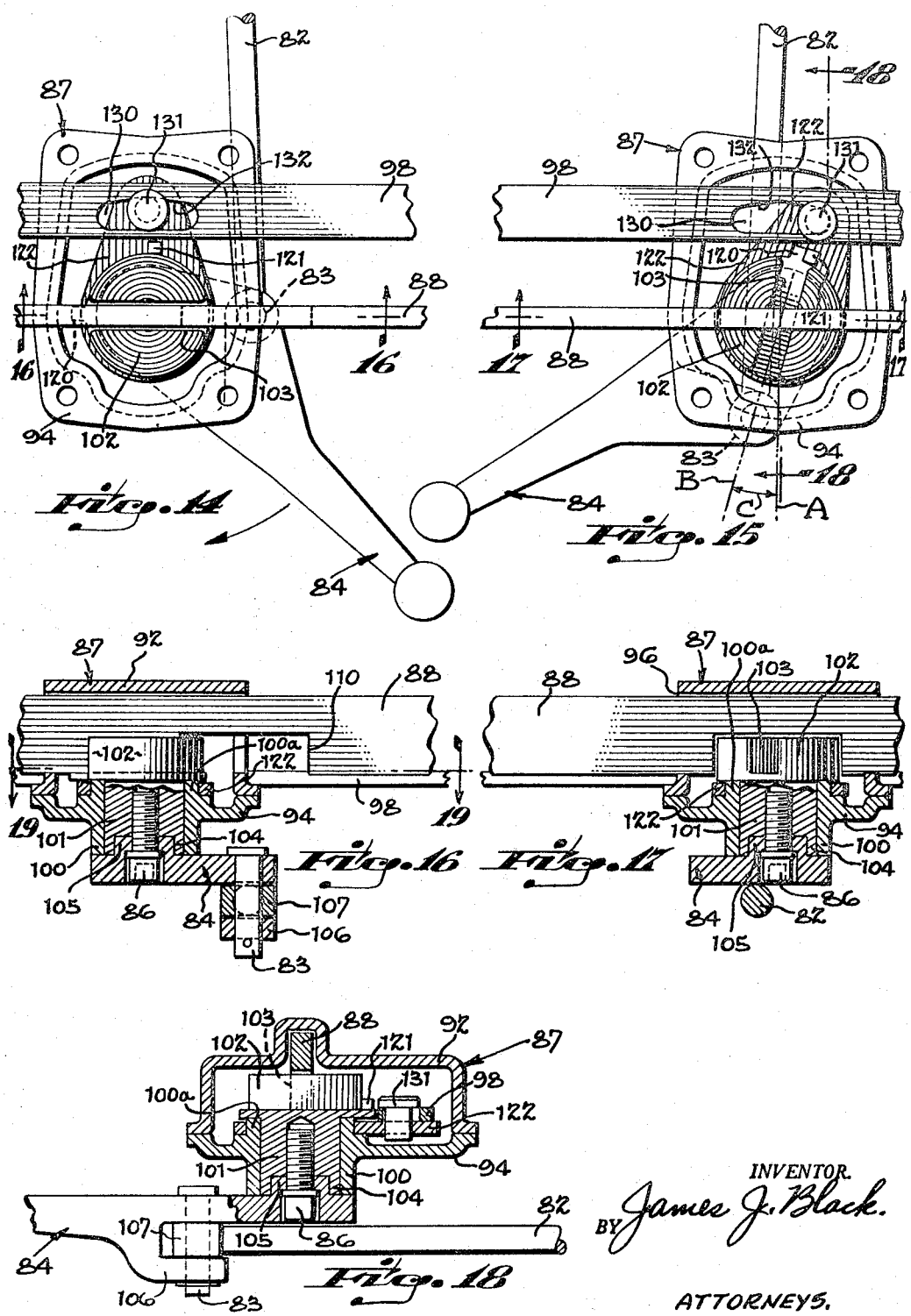

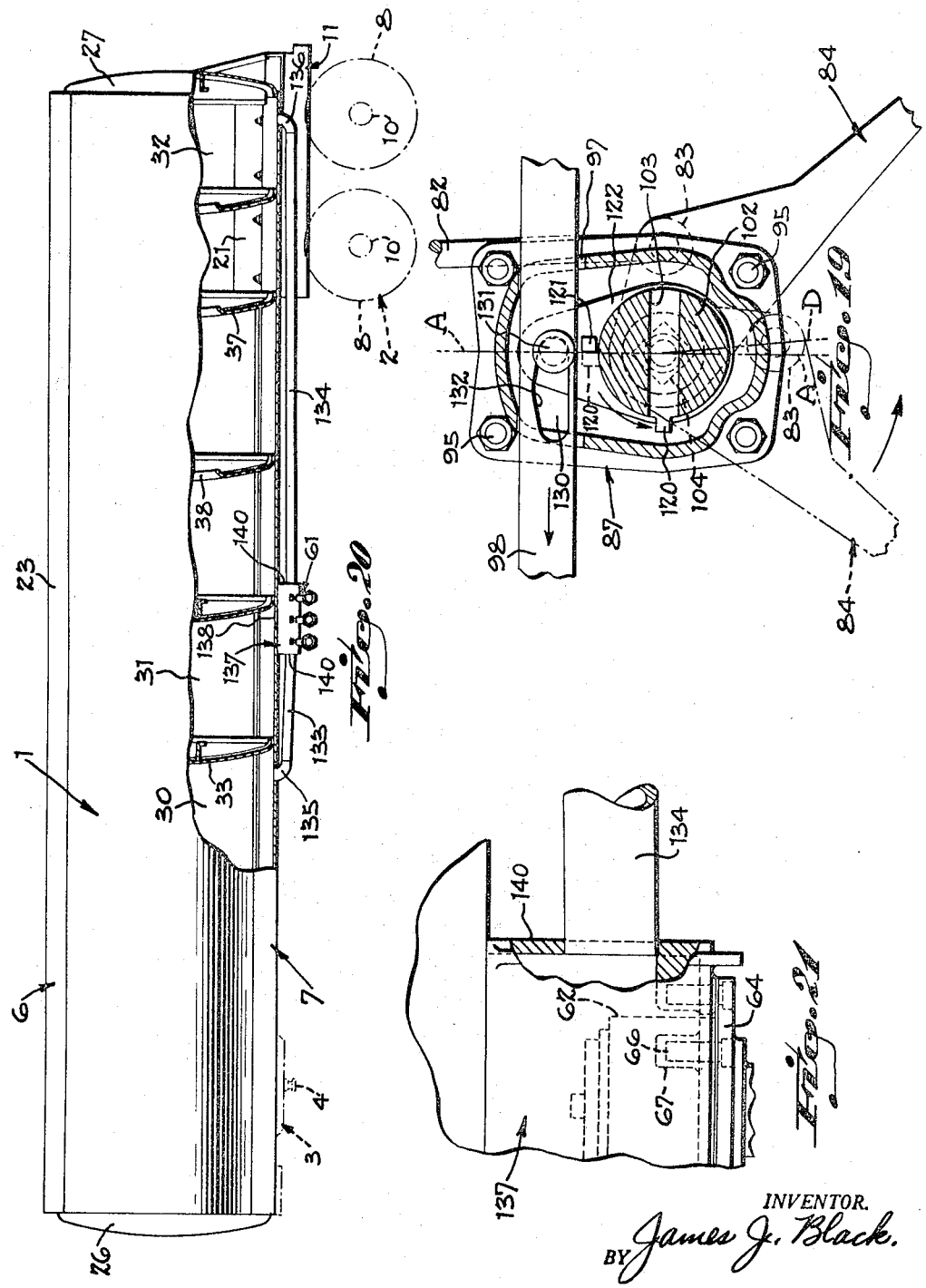

3,310,070
SELECTIVE VALVE ACTUATING MECHANISM FOR VESSELS
James J. Black, Cincinnati, Ohio, assignor, by mesne assignments, to Pullman Incorporated, a corporation of Delaware
Original application Apr. 21, 1961, Ser. No. 104,641, now Patent No. 3,187,766, dated June 8, 1965. Divided and this application Feb. 7, 1964, Ser. No. 349,521
12 Claims. (Cl. 137—637.1)

This invention relates to valving systems for vessels or tanks which are used in the storage or transportation of bulk liquids, such as gasoline, fuel oil and the like. The vessel or tank structure for which the valving system is particularly applicable is intended to be used as a transportable freight container, or for a railway tank car, or for highway vehicles such as trucks and trailers. In the present disclosure, a highway semitrailer, of the type which is used extensively in transporting petroleum products from the distributor to the retailer, has been selected to illustrate the principles of the invention.

The present application is a division of the application of James J. Black entitled "Valving System For Vessels," Ser. No. 104,641, which was filed on Apr. 21, 1961, and is now U.S. Patent No. 3,187,766, dated June 8, 1965.

The present valving system is intended particularly for use in conjunction with tank structures of the type shown in the copending application of James J. Black et al. for "Self Sustaining Vessel," Ser. No. 25,324, now Patent No. 3,131,949, granted May 5, 1964. The copending application discloses a light weight, self-sustaining vessel having a substantial length adapted to reside in a horizontal position upon a pair of spaced stationary supports, or upon running gear disposed at opposite ends of a vehicle, without requiring any external support or bridging structure. In general, the vessel comprises longitudinal upper and lower beams in the form of channel-like extruded metal sections formed of aluminum or other light weight metal, together with longitudinal tank shell sections welded to the opposite side portions of the extrusions and forming the body of the vessel.

To provide for the storage or transportation of different liquid commodities, the elongated vessel is provided with a number of internal bulkheads spaced apart to subdivide the vessel into a series of compartments along its length, which necessarily are sealed with respect to one another. The compartments are filled individually by way of manholes or hatches formed in the upper extruded beam of the vessel, one manhole being provided for each compartment. At the point of delivery, it is necessary to drain each compartment separately so as to avoid any intermixing of the liquid commodities confined in the respective compartments. By way of example, if a bulk cargo of gasoline or other volatile liquid is stored or transported in one or more compartments, while fuel oil or the like is confined in another compartment, intermingling of the volatile commodity with the fuel oil could lower the flash point of the fuel oil to a dangerous level.

One of the primary objectives of the invention has been to provide a drainage system for a vessel comprising a valve box mounted beneath the vessel and having emergency discharge valves which are isolated from one another, with one of the isolated valves in direct communication with the compartment above the valve box, the other valves of the valve box being in communication with the remote compartments by means of drainage passageways, whereby the valve box simplifies the drainage system, the isolated valves adapted to be opened selectively to drain the respective compartments individually.

Another objective has been to provide a simplified, rugged drainage system wherein the valve box includes longitudinal drainage passageways or sumps extending beneath the vessel, the sumps and valve box being generally channel-shaped in cross section and forming a unit adapted to be welded with its open top seated directly against the lower extrusion of the vessel, such that the extrusion coacts with the sump and valve box to form a reinforced longitudinal drainage tunnel communicating with the compartments.

In the disclosure selected to illustrate the invention, the vessel is subdivided by bulkheads into three compartments, the lower extrusion having drainage openings connecting the individual compartments with the sump and with the valve box. The sump is of longitudinally sectional construction, comprising a forward section and a rearward section, preferably in the form of individual castings, both sections leading to the valve box, which is located at an intermediate point along the length of the vessel, the sump sections having open ends which are welded to the valve box. The drainage openings of the forward and rearward compartments communicate with the forward and rearward sump sections, while the intermediate compartment communicates directly with the valve box, so as to eliminate one sump section or drainage passageway. The sump sections and valve box form a simple, one-piece package unit which is capable of being installed in a rapid convenient manner by welding. The two sump sections include bottoms which slope longitudinally and downwardly in opposite directions toward the valve box, and the valve box is located at the lowest point along the vessel to provide drainage.

Each internal emergency valve of the valve box, communicates with an external, hand-operated valve adapted to provide a coupling connection with a hose for conducting the liquid to its point of delivery. The external valves are conventional and are operated by the driver to control the delivery of the liquid from the respective compartments. The internal emergency valves are normally closed and must be opened before it is possible to drain the compartments; these valves are adapted to be closed quickly for safety purposes, as explained below.

As noted earlier, the compartments of the vessel are sealed with respect to one another and necessarily are drained separately to avoid any intermixing of the bulk liquids at the point of delivery, for safety purposes. In addition however, regulations of the Interstate Commerce Commission prohibit any intercompartment transfer of the liquids, that is, the transfer, by pumping or drainage, of liquid from one compartment to another through the valving system of the vessel. These regulations are also promulgated in the interest of safety to prevent, for example, the transfer and intermingling of a volatile liquid from one compartment with fuel oil or the like in another compartment, or to prevent contamination of other kinds of liquids.

A further objective of the invention has been to provide a simple, reliable valve selector mechanism which is adapted to permit only one of the emergency valves to be opened at any given time, thereby to prevent any intercompartment transfer of liquids by way of the valving system and to prevent any intermingling in the discharge of the commodities from the different compartments of the vessel at the external point of delivery.

According to this aspect of the invention, each emergency valve is normally spring-loaded in its closing direction and includes a pull rod connected to a hand-operated valve lever arranged to be shifted manually to open a selected valve while the remaining valves are cocked in closed position, as explained later. The pull rod is connected to the hand lever at a pivot point which swings past a dead center position, so as to provide a self-locking action which holds the spring-loaded valve in open position. In order to permit the emergency valves to close automatically in case of fire, each pull rod is of sectional construction, the two sections being joined by a fusible, low melting point metallic connector. The connector melts under a predetermined temperature, thus adapting the spring-loaded emergency valve to snap to its closed position with the hand lever in valve open position.

In order to normally lock the emergency valves in closed position and to permit the opening of only one selected valve at any given time, each hand lever is coupled to a rotatable locking head having a locking slot extending across its upper portion, the slot being traversed by a selector bar. The selector bar is shiftable lengthwise with respect to the locking heads and includes a series of open notches, one for each head, the notches being arranged in keyed relationship with the individual locking heads. The arrangement is such that the emergency valve for a selected compartment may be opened only when the notch for that particular valve is shifted into registry with the locking head, permitting the head to rotate. The selector bar is shifted longitudinally by a hand-operated selector lever mounted for movement relative to a quadrant having indicating marks corresponding to the compartments to be selected, and including a locking position in which all three of the notches are shifted out of registry with the locking heads, making it impossible to open any of the valves with the hand levers.

A further objective of the invention has been to provide an emergency valve control system adapting the driver to close any one of the open emergency valves from a remote point in the event of a malfunction, such as the leakage or breakage of a discharge hose or other part, or in the event of a fire in the vicinity of the tank.

In general, the emergency control system comprises hand-operated emergency closing lever mounted at a point remote from the valve box, preferably at the nose of the tank, the lever being connected by a pull rod to an emergency control bar which is shiftable longitudinally in response to operation of the emergency lever. The emergency bar extends alongside the locking heads of the several valve levers and each locking head includes a trip lever mounted for swinging motion about the axis of the head, the trip levers being shifted in a valve closing direction upon manual actuation of the emergency bar. Upon being thus shifted, the trip lever of the open valve rotates the locking head in valve opening direction sufficiently to swing the pivot of the pull rod across and beyond its dead center position, thus allowing the spring-loaded emergency valve to snap to its closed position.

From the foregoing, it will be understood that when a given compartment is to be drained, the selector lever is swung from its locking position to a position designating the desired compartment, and the delivery hose is coupled to the hand valve for that particular compartment. Thereafter, the operating lever for the selected valve is shifted to its open position and the hand valve is opened, allowing the contents to flow from the compartment through the sump, valve box and valves to the hose. When a given emergency valve is shifted to its open position, the locking head for that valve will have been rotated sufficiently to bring its slot to an angular position relative to the selector bar; hence, the head acts as a lock with respect to the selector bar. In other words, before the bar can be shifted to select another compartment and valve, the open valve must first be closed, thereby preventing in a positive manner any accidental intermixing of liquids. This interlocking action also prevents any intercompartment transfer of liquids, as referred to earlier.

It will also be understood that the emergency control mechanism has no function in the normal operation of the emergency valves nor does it interfere in any way with normal operation of the valving system. The fusible connectors of the pull rods also operate independently of the emergency control mechanism and provide additional protection since the connectors provide automatic closing of the open valve in the event of fire in the vicinity of the vessel.

The various features and advantages of the present valving system will be more fully apparent to those skilled in the art from the following description taken in conjunction with the attached drawings.

In the drawings:

FIGURE 2 is a longitudinal sectional view, generally similar to FIGURE 1, illustrating the internal bulk heads which subdivide the tank longitudinally into separate compartments, together with the baffles which subdivide the compartments.

FIGURE 3 is an enlarged sectional view detailing the forward portion of the tank, the drainage sump, and the valve chamber.

FIGURE 4 is a continuation of FIGURE 3, showing the rearward compartment and drainage sump.

FIGURE 5 is a cross sectional view taken along line 5—5 of FIGURE 4, showing one of the baffles of the tank.

FIGURE 6 is a cross sectional view taken along line 6—6 of FIGURE 3, illustrating one of the bulkheads of the tank.

FIGURE 7 is an enlarged fragmentary side view taken from FIGURE 1, detailing the valve chamber, the selector lever, the valve actuating levers, and the internal emergency valves which control the delivery of liquid from the individual tank compartments.

FIGURE 8 is a sectional view taken along line 8—8 of FIGURE 7, detailing the valve chamber and valving system.

FIGURE 9 is a cross sectional view taken along line 9—9 of FIGURE 8, further detailing the sump structure.

FIGURE 11 is a diagrammatic plan, as viewed along line 11—11 of FIGURE 7, illustrating the valve operating levers and selector mechanism.

FIGURE 12 is a sectional view taken along line 12—12 of FIGURE 11, showing the selector mechanism in a position locking the valves in closed position.

FIGURE 13 is a view similar to FIGURE 12, showing the selector bar shifted to a second position adapting a selected valve to be opened.

FIGURE 14 is a fragmentary plan, as viewed along line 14—14 of FIGURE 12, showing the selector bar shifted to locking position with respect to one of the valve locking heads.

FIGURE 15 is a view similar to FIGURE 14, taken along line 15—15 of FIGURE 13, showing the selector bar shifted to the release position with respect to the locking head, with the head rotated to the valve open position.

FIGURE 16 is a sectional view taken along line 16—16 of FIGURE 14, further detailing the selector bar and valve locking head in the locked position.

FIGURE 17 is a sectional view similar to FIGURE 16 taken along line 17—17 of FIGURE 15, showing the parts in unlocked position.

FIGURE 18 is a sectional view taken along line 18—18 of FIGURE 15 detailing the construction of the selector bar and emergency control bar in relation to the valve locking head.

FIGURE 19 is a sectional view taken along line 19—19 of FIGURE 16, showing the locking head snapped to valve closing position through operation of the emergency control bar.

FIGURE 20 is a side elevation of a tank type semitrailer partially broken away and illustrating a modified sump arrangement.

FIGURE 21 is an enlarged fragmentary view partially broken away illustrating the valve chamber of the modified structure.

Tank structure

Figure 1:
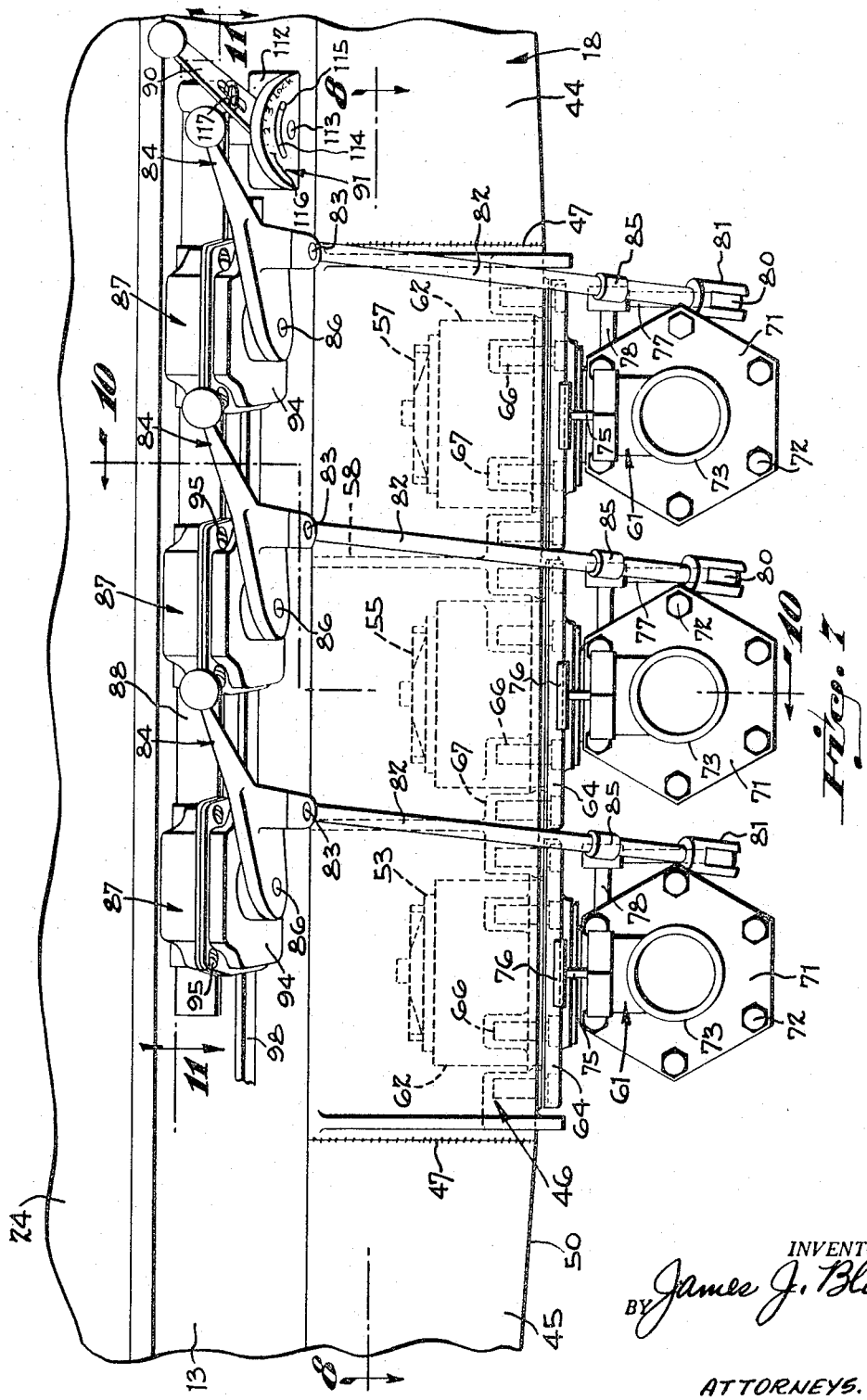
FIGURE 1 is a side elevation of a tank type semitrailer embodying the sump and valving system of the present invention.

Described generally with reference to FIGURES 1 and 2, the drainage and valving apparatus of this invention is illustrated in relation to a semitrailer comprising a generally horizontal, self-supporting vessel or tank, indicated generally at 1, which includes running gear, indicated generally at 2, at its rearward end and a fifth wheel, indicated generally at 3, at its forward end. The fifth wheel is arranged to be supported upon the mating fiifth wheel of a tractor (not shown) and includes a king pin 4 which establishes a draft connection with the coupling jaws of the tractor fifth wheel. Thus, during roadway transport, the forward end of the tank is supported on the tractor fifth wheel and when the vehicle is uncoupled, as shown in FIGURE 1, the forward portion of the vehicle is supported upon a landing gear or prop structure, which is indicated generally at 5.

Although a semitrailer has been selected to illustrate the principles of the present drainage and valving system, the system is also intended for containers or vessels used in the storage and transportation of liquids generally. For example, the valving system is intended for horizontal storage tanks and for railway tank car service in the transportation of bulk liquids by rail.

Since the vessel is supported at opposite ends upon the running gear 2 and the fifth wheel 3 during road transport, the vessel acts as a hollow beam in supporting the weight load of the bulk liquid which it confines. As described in the aforesaid copending application, longitudinal stiffness sufficent to resist the forces acting upon the light weight longitudinal vessel is imparted principally by an upper extrusion 6 and a coacting lower extrusion 7, both of which form a part of the tank structure. In addition, the tank includes internal bulkheads and bracing structure coacting with the longitudinal extrusions to provide a vessel which is capable of resisting the stresses and strains of roadway transport reliably and without danger of structural failure. The prop, running gear, fifth wheel and other components, adapting the vessel to roadway service, in and of themselves may be conventional. These components are connected to the lower extrusion 7, as described in the copending application.

As viewed in FIGURES 1 and 2, the running gear 2 is of the tandem type, comprising sets of road wheels 8—8 carried on tandem axles 10—10, the axles being connected to a tandem spring suspension (not shown) which equalizes the weight load imposed upon the two sets of wheels 8. The spring suspension is carried by an undercarriage 11 which includes side plates 12—12 extending downwardly from the longitudinal stiffener ribs of flanges 13—13 of the lower extrusion 7 (FIGURE 5). A series of secondary flanges of ribs 14, located between the flanges 13—13 also extend longitudinally of the lower extrusion end, in combination with the flanges 13, increase the longitudinal stiffness of the extrusion.

Figure 10:
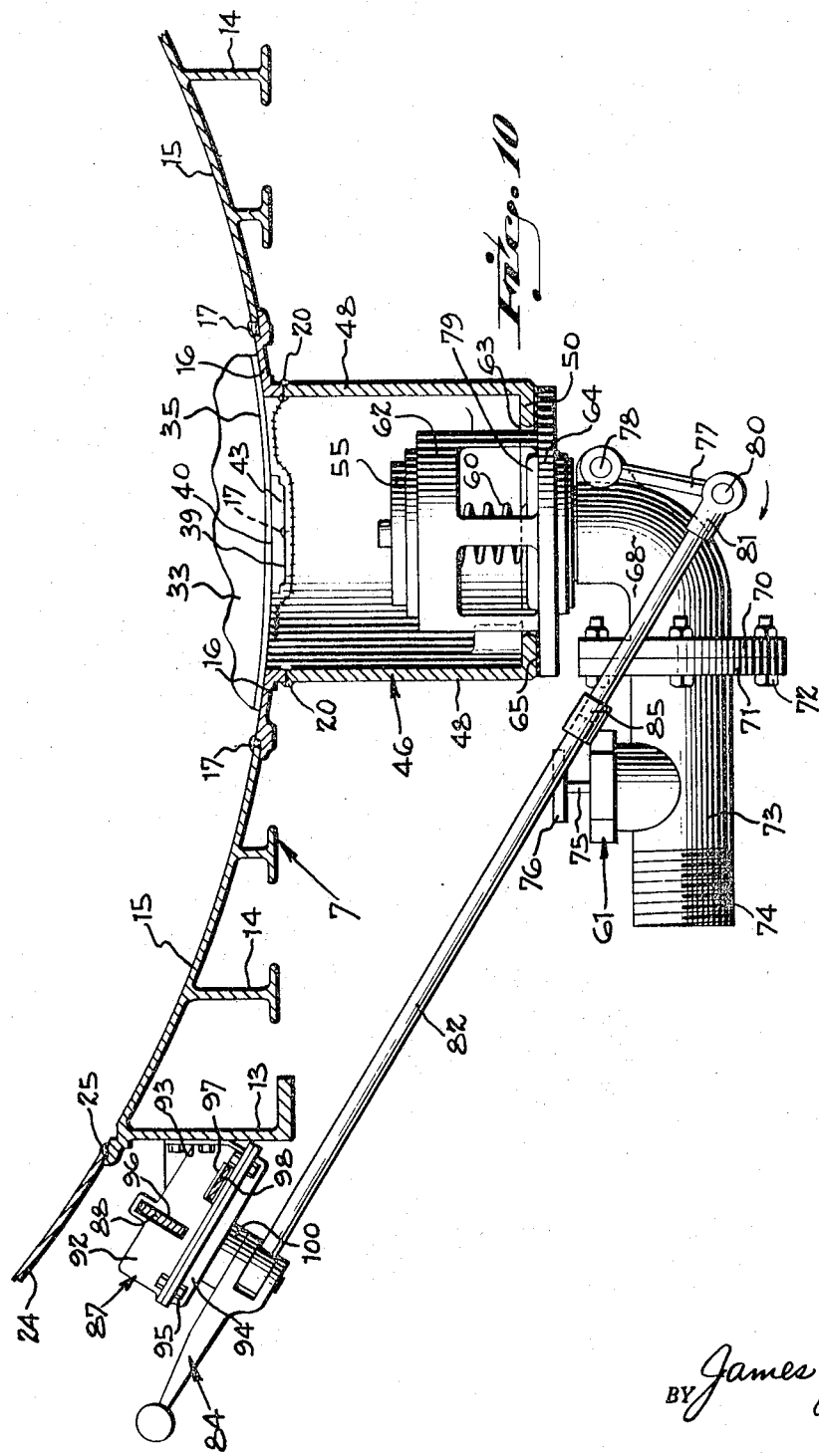
FIGURE 10 is an enlarged fragmentary cross sectional view taken along line 10—10 of FIGURE 7, detailing the valve actuating mechanism in relation to the valve chamber and tank structure.

As viewed in FIGURE 10, the lower extrusion 7 is of sectional construction, comprising four full length sections welded together to form a one-piece beam. Thus, in the form illustrated, the extrusion is composed of a pair of outer extruded sections 15—15 and a pair of inner extruded sections 16—16, the sections being joined to one another along the longitudinal weld lines 17. The drainage sump or drain tunnel, indicated generally at 18 (FIGURE 5), is channel-shaped in cross section, having its upper edges welded as at 20 to the central portion of the lower extrusion 7.

As viewed in FIGURE 5, the side plates 12 extend downwardly to a plane below the sump, such that there is no interference between the sump and the components of the tandem suspension. In order to further strengthen the rearward portion of the vessel in the area of the undercarriage, there is provided a pair of internal horizontal braces 21—21 (FIGURES 4 and 5), which rise upwardly from the lower extrusion in the vertical plane of the respective flanges 13, the lower edge of each brace 21 being welded to the extrusion. As shown in FIGURES 2 and 3, similar internal horizontal braces 22 are mounted within the forward portion of the tank in the area of the fifth wheel 3. The fifth wheel 3 is in the form of a composite plate structure which is welded to the lower edges of the flanges 13 and 14 (not shown).

The upper extrusion 6 (FIGURE 5) may also be of sectional construction, comprising several longitudinal extrusions welded in assembly. To impart additional stiffness, the upper extrusion is provided with a pair of flanges 23—23 which are T-shaped in cross section. The upper extrusion is provided with manholes or hatches for filling the individual compartments of the tank, as explained later. As viewed in FIGURES 5 and 6, the tank preferably is cylindrical in cross section, the body of the tank comprising curved side wall panels or shells 24—24 which are formed of sheet metal, the edges of the shells being welded as at 25 to the marginal portions of the upper and lower extruded metal sections. The opposite ends of the tank are enclosed by forward and rearward end walls 26 and 27 (FIGURES 3 and 4), which are welded as at 28 to the opposite ends of the tank shell.

In the present disclosure (FIGURE 2), the vessel is subdivided longitudinally by bulkheads 33 into three compartments, comprising a forward compartment 30, an intermediate compartment 31 and a rearward compartment 32, which adapt the vessel to the transportation of different liquid products which are separately discharged, as explained later. The compartments are filled individually by way of the three manholes or hatches 34 which are formed in the upper extrusion 6. The manholes are provided with suitable covers (not shown) to seal the compartments.

Described with reference to FIGURES 2, 3, and 6, each bulkhead includes a marginal flange 35, joined by welding to the internal surface of the tank, that is, to the upper and lower extrusions 6 and 7 and to the sheet metal shells 24 of the tank. Each bulkhead is reinforced by bracing members 36 which interfit the concave configuration of the bulkhead. The bracing members preferably are sprung in place then welded so as to pre-stress the bulkhead. The pre-stressed bulkheads thus provide load transfer members interconnecting the upper and lower extrusions, such that the lower extrusion acts primarily as a spine component, while the upper extrusion coacts with the lower extrusion principally in compression in resisting the load and shock forces.

The compartments 30 and 32 are subdivided by baffles 37, which are generally similar to the bulkheads, including flanges 35 which are welded in place in the same manner. Each baffle includes an opening 38 permitting the flow of liquid therethrough. As viewed in FIGURE 5, the lower extrusion includes a central channel way 39. The edge of each baffle spans the channel way, thus leaving an opening 40 to provide drainage across the lower edge of the baffle, thereby to permit residual liquid to drain from the compartments. The upper extrusion 6 (FIGURE 5) is provided with a similar channel way 41 to provide venting of gas across the upper edges of the baffles. In order to seal off the compartments from one another at the bulkheads 33 (FIGURES 6 and 10) the upper and lower channel ways 41 and 39 are blocked off by suitable inserts, as indicated at 42 and 43, which interfit the opening delineated by channel way. The inserts are welded permanently in place and seal the bulkheads with respect to the internal surface of the vessel.

Sump and valve arrangement

The semitrailer is extensively used in the highway transport of petroleum products from the distributor to the retailer. The compartments 30, 31 and 32 may all be loaded with the same commodity, such as gasoline, or they may be loaded with different commodities, such as fuel oil in one compartment and more volatile liquids in other compartments. It will be understood that it is extremely important to prevent any intermixing of volatile liquid such as gasoline with the fuel oil, since such intermixing could lower the flash point of the fuel oil to a dangerous level. The present valving system is provided with an individual valve for each compartment and includes a manually controlled selector mechanism which normally locks all of the valves in a closed position and which allows only one selected valve to be opened at any given time, thereby preventing intermixing of the different liquids.

As best shown in FIGURES 1–4, the sump 18 extends longitudinally of the tank and comprises a rearward section 44, a forward section 45 and a valve chamber or box 46 interposed between the two sump sections. The sump sections and valve box preferably are in the form of castings, the ends of the sections 44 and 45 being welded as at 47 (FIGURE 8) to the valve box to form a one-piece unit. As viewed in FIGURES 8–10, the sump sections and valve box are generally channel-shaped, each comprising a pair of sidewalls 48—48, a bottom wall 50 and an open top. The bottom wall 50 of the rearward sump section 44 (FIGURE 4) slopes downwardly from the rearward end of the tank toward the valve box 46 and the bottom wall of the forward section (FIGURE 3) slopes downwardly in the rearward direction toward the valve box. Each sump section includes an end wall 51.

The sump assembly preferably is installed after fabrication of the tank, the upper edges of the side walls 48 being welded to the bottom extrusion, as indicated previously at 20 (FIGURES 9 and 10), whereby the extrusion forms the top closure of the sump and valve box. The forward compartment 30 is drained by way of an opening 52 (FIGURE 3) in the lower extrusion, communicating with the forward sump section 45 which leads to a normally closed emergency valve 53 mounted in the valve chamber 46. The intermediate compartment 31 is drained by way of an opening 54 in the lower extrusion, communicating with a second emergency valve 55. The rearward compartment 32 (FIGURE 4) is drained by way of an opening 56 communicating with the rearward sump section 44 leading to an emergency valve 57.

As detailed in FIGURE 8, the valve box includes a cylindrical housing 58 joined to the side walls 48—48 of the valve box and arranged to isolate the emergency valve 55 from the sump sections. The three emergency valves 53, 55 and 57 thus provide individual drainage of the compartments 30, 31 and 32. It is to be understood at this point, that the tank has a natural pitch or slope toward the rear, such that the liquid drains by gravity toward the openings 52, 54 and 56, which are located at the rearward end of each compartment. The slope of the rearward sump section is greater than the pitch of the tank bottom, such that the liquid all drains toward the valve chamber which is positioned at the lowest point along the length of the sump assembly. As noted earlier, the residual liquid drains from the compartments along the channel way 39, which delineates drain openings along the lower edges of the baffles.

The emergency valves 53, 55 and 57 are commercial products and have not been disclosed in detail. These valves are spring-loaded as at 60 (FIGURE 10) and are normally held in a closed position, being opened only by manual operation of the selector mechanism, as described in detail later. The purpose of the emergency valves is to stop the flow of liquid immediately should any malfunction develop (such as hose leakage or fire) while the compartment is being drained. The actual rate of flow is regulated by conventional hand-operated, flow control valves disposed to the exterior of the valve chamber, as indicated at 61 in FIGURE 10. The emergency valves also prevent loss of the liquid in case the flow control valves should accidentally become opened or broken.

Each emergency valve includes a cage 62 (FIGURE 10) projecting upwardly through an opening 63 formed in the bottom wall 50 of the valve box or housing. Each cage includes a circular flange 64 having a gasket 65 seated against the bottom wall 50 and surrounding the opening 63. The flange of each cage is clamped in place by means of screws 66 (FIGURES 7 and 8) threaded into lugs 67 formed in the valve box, the heads of the screws being countersunk in the flange 64. The valve may thus be removed from the bottom of the valve box for maintenance or replacement, simply by removing the screws 66.

Each emergency valve communicates with an elbow 68 (FIGURE 10) which includes a flange 70 at its outer end, a mating flange 71 of the outlet valve 61 being bolted as at 72 to the flange 70. The elbow 68 forms a shear section adapted to be broken under a predetermined impact force so as to protect the sump 18 and other drainage components in case of an accident, as required by law. Each outlet control valve 61 includes an outlet fitting 73 which is screw threaded as at 74 to accommodate the coupler of a hose for conveying the liquid from the compartment to its delivery point or storage tank. The valve 61 is conventional and includes a stem 75 having a hand grip 76 for regulating the flow of liquid from the compartment.

Each normally closed emergency valve is opened by an arm 77 (FIGURE 10), the arm being secured to a rock shaft 78 which is interconnected with the valve element 79 of the emergency valve. When the arm is shifted in the direction indicated by the arrow, the valve element 79 is shifted to an open position counter to its spring biasing means 60. It will be understood that both the control valve 61 and the related emergency valve must be opened before the liquid can be delivered from the compartment.

The swinging end of each control arm 77 is pivotally connected as at 80 to a clevis 81 which is secured to the lower end of a pull rod 82. The upper end of each pull rod is pivotally connected as at 83 (FIGURE 7) to a manually operated lever, indicated generally at 84, there being provided an individual pull rod and lever for each of the emergency valves. As shown in FIGURES 7 and 10, each pull rod 82 is of two-piece construction, the two pieces being joined together by a fusible coupling collar 85 formed of a metal having a melting point in the neighborhood of 200 degrees F. Thus, in the event of a fire in the area of the tank, the fusible collar will melt, allowing any open spring-loaded emergency valve to snap automatically to its closed position, thereby to shut off the flow of liquid.

Valve selector and emergency valve closing mechanism

As shown in FIGURE 7, each of the valve operating levers 84 is secured as at 86 to a valve locking stem, which is journalled in a housing indicated generally at 87. The valves are unlocked individually by a longitudinally shiftable selector bar 88 which passes through the housings 87; the selected valve opened by shifting its lever 84. One end of the bar 88 is connected to a manually operated selector lever 90, such that the lever 90 swings relative to a quadrant, indicated generally at 91. The quadrant includes index marks corresponding to the three valves of the compartments 30, 31 or 32, the selected valve being unlocked when the selector lever 90 is shifted into alignment with the indication for that particular valve. In the position of lever 90 shown in FIGURE 7, all three of the valves are locked in the closed position.

The selector lever 90 may be sealed in the locking position by a conventional metal sealing strip, if necessary.

Described in detail with reference to FIGURE 10, each housing 87 comprises a body portion 92 including a mounting bracket 93 which is attached by screws to the side flange 13 of the lower extrusion. The body 92 includes a base or cover plate 94 which is secured in place by screws 95. The wall of the body portion 92 includes rectangular openings 96 at opposite side to accommodate the selector bar 88 which passes slidably therethrough. The body 92 includes a second pair of rectangular openings 97 to accommodate the emergency control bar 98, as explained later in detail.

Referring to FIGURES 14–18, the base plate 94 of each housing 87 includes a bearing boss 100 in which is journalled the valve locking stem 101. The stem includes a cylindrical locking head 102, the upper portion of the head being diametrically slotted as at 103 (FIGURE 14) to accommodate the selector bar 88. The valve locking stem 101 includes a square socket 104, and the valve operating lever 84 is provided with a square lug 105 interfitting the socket and providing keyed connection with the valve locking stem. Adjacent the lug 105, the lever 84 includes a forked portion 106 (FIGURE 18). The pivot pin, previously indicated at 83, passes through the fork and the head 107 of the pull rod 82, thus connecting the pull rod to the lever.

Each lever 84 normally resides in the valve closing position shown in FIGURE 14, and is swung to the position shown in FIGURE 15 when the valve is to be opened. It will be understood at this point, that the selector bar 88 in its locked position passes through the slot 103 of head 102, thus locking the head and hand lever 84 in the valve closing position (FIGURES 14 and 16). In order to selectively release the hand levers 84 to permit opening of one of the valves, the selector bar is provided with three open notches indicated at 108, 110 and 111 (FIGURES 11–13), each having a length slightly greater than the diameter of the locking heads 102. In the locked position of the selector lever 90, as shown in FIGURES 11 and 12, the selector bar is held in a position wherein the notches are out of registry with the cylindrical locking heads 102 of the three levers, with the bar passing through the slots 103 thereof, thus locking all three valve levers 84 in closing position. The notches are located in keyed relationship to the three locking heads 102, the arrangement being such that, as the bar is shifted longitudinally, the notches are successively aligned with the three locking heads, thus unlocking the hand levers 84 in sequence.

As viewed in FIGURE 7, the quadrant 91 is provided with a flange 112 which is secured to the flange 13 of the lower extrusion in the same manner as the housings 87. The selector lever 90 is pivotally connected by a pin 113 (FIGURE 11) to the quadrant. The quadrant includes an arcuate slot 114 and the lever has a pin 115 traversing the slot and serving as an indicator with respect to the indicating marks 116 of the quadrant. The selector bar 88 is connected to the lever 90 by a pin 117 projecting from the bar and engaged in a slot 118 formed in the lever.

Thus, when the lever 90 is shifted from the "lock" position shown in FIGURE 11 toward the left to align the pin 115 with the "3" graduation, the notch 111 will be shifted into registry with its related locking head 102, thus releasing the head for rotary motion. This permits the valve for the rearward tank compartment 32 to be opened. When the selector lever 90 is shifted to the "2" graduation, then the intermediate notch 110 registers with its related head 102 of the intermediate valve, as shown in FIGURE 13, adapting the intermediate compartment 31 to be drained. When the lever is shifted to the "1" graduation, the notch 108 registers with the head of the valve which controls the forward compartment 30.

From the foregoing, it will be seen that the selector mechanism either locks all of the emergency valve levers in the closed position (with the selector lever 90 in the locked position) or permits only one of the three valves to be opened individually at any given time, thereby to prevent any intermixing of the contents of the three tank compartments. It will also be noted that when one of the locking heads 102 is shifted to valve open position (FIGURES 15–17) the slot 103 of the head is turned substantially to a right angular position with respect to the selector bar 88. Accordingly the locking head now acts as an interlock which prevents selector bar 88 from being shifted from its previously selected position; hence, the other valves are locked positively in closed position and cannot be selected or opened until the open valve is shifted back to the closed position.

Referring to FIGURES 14 and 15, it will be noted that the valve operating lever 84 and stem 101 coact in toggle fashion with respect to the pull rod 82 to hold the spring-loaded emergency valve in open position when the lever 84 is shifted to the limit of its valve open position of FIGURE 15. Thus, as the lever is swung toward the left, as indicated by the arrow, from the postion of FIGURE 14, the center of the pivot pin 83 swings through a dead center position with respect to the center of the valve stem 101, as indicated by the broken line A in FIGURE 15. In the fully open position, the center of the pivot pin 83 (as indicated by the line B) passes beyond the dead center point, as indicated by the angle C, thus locking the emergency valve in its open position counter to its spring. In order to close the valve manually, therefore, it is necessary to force the lever 84 toward the right to and beyond the dead center point, allowing the spring biasing means to force the valve to its closed position, and thereby bringing the control lever 84 back to the position of FIGURE 14.

For emergency valve closing, each locking head 102 includes a radial finger 120 (FIGURE 15) which engages a lug 121 projecting upwardly from a trip lever 122 in the valve open position of lever 84. The trip levers 122 form part of the emergency control mechanism for closing the valves from a remote point in case of emergency, as described below. As viewed in FIGURES 1 and 11, the remote valve closing lever 123 is pivotally connected as at 124 to a bracket 125 which is attached to the flange 13 at the forward end of the tank. This lever has no function during normal unloading operations; however, in the event of an emergency, such as the breaking of a discharge hose, or in case of fire in the vicinity of the tank while draining a compartment, the remote emergency lever 123 is shifted forwardly to close that emergency valve which is open.

As shown in FIGURE 11, the emergency control bar 98, which passes slidably through the control housings 87, has its forward end pivotally connected as at 129 to a pull rod 126. The forward end of the pull rod is pivotally connected as at 127 to the slotted portion 128 of the emergency lever 123, such that bar 98 is shifted lengthwise in a forward direction when the lever 123 is swung forwardly through its arc of motion. As shown in FIGURES 11, and 14–17, the emergency control bar 98 includes three slots indicated at 130, each slot being traversed by a pin 131 projecting upwardly from the respective trip levers 122. Each trip lever 122 is rotatably mounted upon an upper portion 100a of the bearing boss 109, such that the trip lever is mounted for swinging motion in concentric relationship with the valve locking spindle 101 and independently of the spindle.

In the valve closed position of FIGURE 14, the pin 131 of trip lever 122 resides at a mid-point with respect to the slot 130. The outer edge of the slot is developed along an arc, as indicated at 132 to permit swinging movement of trip lever pin. Thus, when the valve lever 84 is swung to the valve open position of FIGURE 15, the radial finger 120 of the locking head 102 swings into engagement with the lug 121, thereby to shift the trip lever 122 to its cocked position toward the right, with its pin 131 engaging the end of its slot 130. In the valve open position of FIGURE 15, therefore, the spring-loaded trip lever 122, through operation of the pull rod, is held in cocked position by engagement of its pin 131 with the slot of the emergency control bar 98.

Referring now to FIGURES 15 and 19, it will be observed that when the remote emergency lever 123 is swung forwardly, the control bar 98 will be shifted toward the left, as indicated by the arrow, thus swinging the trip lever 122 toward the left from the position of FIGURE 15 to the position of FIGURE 19. The trip lever, through engagement of the lug 121 and radial finger 120, thus rotates the head 102 and swings the valve lever 84 toward the right (in valve closing direction) toward the position shown in full lines in FIGURE 19. As the lever reaches the broken line position, the center of the pivot pin 83 will have passed beyond the dead center position, as indicated by the line A (FIGURE 19), to the position indicated by the line D. At this point, the spring-loaded valve closes itself, and through operation of the spring-loaded pull rod 82, swings the lever 84 to the valve closed position, as shown in full lines.

From the foregoing, it will be observed that the emergency control bar 98 and its coacting parts do not in any way interefere with the normal selection and operation of the emergency valves. On the other hand, the emergency mechanism is effective in a positive and rapid manner to close the open valve from a remote point in case of any malfunction or accident. The fusible coupling collars 85 mentioned earlier, operate independently of the emergency control mechanism described above. In other words in case of fire, the fusible collar will allow the valve to snap to its closed position automatically if no one is at the scene to operate the emergency remote control lever.

*Modified sump structure*

According to the modified arrangement shown in FIGURES 20 and 21, the sump sections 44 and 45 have been replaced with a forward pipe section 133 and a rearward pipe section 134. The forward pipe section includes an elbow 135 communicating with the forward compartment 30 and the rearward section 134 includes an elbow 136 communicating with the rearward compartment 32. Both pipe sections communicate with a valve box 137 which may be welded directly to the lower extrusion, as described earlier with reference to the valve box 46. The lower extrusion includes an opening 138 providing direct communication between the intermediate compartment 31 and the valve box.

The internal construction of the valve box identical to that shown in FIGURE 8 except for the addition of walls 140–140 at opposite ends (FIGURE 21) to receive the pipe sections 133 and 134, the pipe sections preferably being welded into the end walls. The emergency valves are mounted within the valve box, together with the acuating mechanism described earlier for manual and emergency remote control of the valves.

Having described my invention, I claim:

1. In a valving system for a vessel having a valve chamber including a plurality of normally closed discharge valves, a mechanism for opening said valves individually comprising, an actuating element connected to each of said valves and adapted to open the valves, respective control means for each of said valves including a rotary element for each actuating element and connected to each valve actuating element, a valve operating lever coupled to each of said rotary elements, whereby upon swinging motion of the lever in valve opening direction, the valve is shifted to an open position, and shiftable selector means interconnected with said rotary elements and normally locking said operating levers in valve closing position, said selector means comprising reciprocable means having a plurality of spaced apart locking lug portions, one locking lug portion having locking engagement with each respective rotary element, said selector means adapted to move one of said lug portions out of registry with a complemental rotary element to release one of said rotary elements upon being shifted to a selected release position, thereby adapting the selected lever and valve to be shifted to an open position.

2. In a valving system for a vessel having a valve chamber including a plurality of normally closed discharge valves, a mechanism for opening said valves individually comprising, an actuating element connected to each of said valves and adapted to open the valves, respective control means for each of said valves including a rotary element connected to each valve actuating element, a valve operating lever coupled to each of said rotary elements, whereby upon swinging motion of the lever in valve opening direction, the valve is shifted to an open position, shiftable selector means interconnected with said rotary elements and normally locking said operating levers in valve closing position, said selector means adapted to release one of said rotary elements upon being shifted to a selected release position, thereby adapting the selected lever and valve to be shifted to an open position, an emergency valve closing mechanism interconnected in common with said rotary elements, and a manually operated actuating device mounted at a point remote from the valve chamber and connected to said emergency mechanism, said emergency mechanism adapted to shift the rotary elements in a direction to close the open valve upon manual operation of said actuating device.

3. In a valving system for a vessel including a plurality of normally closed discharge valves, mechanism for opening said valves individually comprising, an operating arm connected to each of said valves and adapted to open the valves, respective control means for each of said valves including a rotary element, a manual valve operating lever coupled to each of said rotary elements, a pull rod having an end connected to each of said actuating arms, pivot means at the opposite end of each pull rod connecting the same to the operating lever at a point spaced outwardly from the axis of the rotary element, whereby upon swinging motion of the lever in valve opening direction of the pivot means passes beyond a dead center position with respect to the axis of the rotary element and thereby locks the selected valve in an open position, shiftable selector means interconnected with said rotary elements and normally locking said elements and operating levers in valve closing position, said selector means comprising reciprocable means having a plurality of spaced apart locking lug portions, one locking lug portion for locking engagement with each respective element, said selector means adapted to release a selected rotary element upon being shifted to a selected release position, thereby adapting the selected lever and valve to be shifted to an open position, and a manually operated selector device connected to the selector means for shifting the same to said selected release positions.

4. In a valving system for a vessel having a valve chamber including a plurality of spring-loaded normally closed discharge valves, a mechanism for opening said valves individually comprising, an actuating element connected to each of said valves and adapted to open the valves, respective control means for each of said valves including a rotary element, a manual valve operating lever coupled to each of said rotary elements, a pull rod having an end connected to each of said valve actuating elements, pivot means at the opposite end of each pull rod connecting the same to the operating lever at a point spaced outwardly from the axis of the rotary element, whereby upon swinging motion of the lever in valve opening direction, the pivot means passes beyond a dead center position with respect to the axis of the rotary element and thereby locks the selected valve in an open position, shiftable selector means interconnected with said rotary elements and normally locking said operating levers in valve closing position, said selector means adapted to release a selected rotary element upon being shifted to a selected release position, thereby adapting the selected lever and valve to be shifted to an open position, and an emergency valve closing mechanism interconnected with said rotary elements and including a manually operated device for actuating the same, said emergency mechanism, upon operation of the said device, adapted to rotate the rotary element of an open valve in valve closing direction, thereby to swing the pivot means across the dead center position, adapting the spring-loaded valve to snap to closed position.

5. In a valving system for a vessel having a valve chamber including a plurality of spring-loaded normally closed discharge valves, a selector mechanism for opening said valves individually comprising, an actuating element connected to each of said valves and adapted to open the valves upon being shifted to a valve opening position, a respective control housing for each of said valves, a valve locking spindle journalled in each of said housings, a manual valve operating lever coupled to each of said spindles, a respective pull rod having an end pivotally connected to said actuating element, pivot means connecting the opposite end of each pull rod to a respective operating lever at a point spaced outwardly from the axis of the spindle, whereby, upon swinging motion of the lever in valve opening direction the pivot means passes beyond a dead center position with respect to the axis of the spindle and thereby locks the spring-loaded valve in an open position, a respective trip lever pivotally mounted in each of said housings and adapted to engage and rotate said valve locking spindles in valve closing direction, thereby to shift the pivot means across said dead center position, adapting the open valve to snap to closed position, and emergency valve closing means adapted to shift said trip levers in said valve closing direction.

6. In a valving system for a vessel having a valve chamber including a plurality of normally closed discharge valves, a selector mechanism for opening said valves individually comprising, an actuating arm connected to each of said valves and adapted to open the valve upon being shifted to a valve opening position, a respective control housing for each of said valves, a valve locking spindle journalled in each of said housings, a locking head having a cross slot mounted on each of said spindles, a valve operating lever coupled to each of said spindles and connected to said actuating arm, whereby, upon swinging motion of the lever the valve is shifted to an open position, and a shiftable selector bar passing through said control housings adjacent said locking heads and slidably traversing the slots of said locking heads, said selector bar normally locking said locking heads, spindles and operating levers in valve closing position, said selector bar including a plurality of open notches located in keyed relation to said locking heads and adapted to release selected locking heads when the bar is shifted longitudinally to positions bringing said notches into registry with selected locking heads, thereby adapting the selected operating lever and valve to be shifted to an open position.

7. In a valving system for a vessel having a valve chamber including a plurality of spring-loaded normally closed discharge valves, a selector mechanism for opening said valves individually comprising, an actuating arm connected to each of said valves adapted to open the valves upon being shifted to a valve opening position, a respective control housing for each of said valves, a valve locking spindle journalled in each of said housings, a valve operating lever coupled to each of said spindles, a respective pull rod having an end pivotally connected to said actuating arm, pivot means connecting the opposite end of each pull rod to a respective operating lever at a point spaced outwardly from the axis of the spindle, whereby, upon swinging motion of the lever in valve opening direction the pivot means passes beyond a dead center position with respect to the axis of the spindle and thereby locks the spring-loaded valve in an open position, and a shiftable selector mechanism normally adapted to lock said locking spindles and operating levers in valve closing position, said selector mechanism comprising reciprocable means having a plurality of spaced apart locking lug portions, one locking lug portion for locking engagement with each respective locking spindle, said selector mechanism adapted to release selected locking spindles when shifted to selected release positions thereby adapting the selected operating lever and valve to be shifted to an open position.

8. In a valving system for a vessel having a valve chamber including a plurality of automatically closing discharge valves, a mechanism for opening said valves individually comprising, a valve actuating element connected to each of said valves and adapted to open the valve, respective control means for each of said valves including a rotary element, a manual valve operating lever coupled to each of said rotary elements, a pull element having an end connected to each of said valve actuating elements, pivot means at the opposite end of each pull element connecting the same to the operating lever at a point spaced outwardly from the axis of the rotary element, whereby upon swinging motion of the lever in valve opening direction, the pivot means passes beyond a dead center position with respect to axis of the rotary element and thereby locks the selected valve in an open position, each rotary element having an open slot formed therein, and a shiftable selector element extending through said slots and normally locking said rotatable elements in valve closed position, said selector element having a plurality of notches formed therein in keyed relation to said rotatable elements, one for each rotatable element, said selector element being adapted to be shifted to bring said notches individually into registry with said rotatable elements and thereby adapting a selected rotatable element to be rotated to the valve open position, and heat-responsive means interposed in each of said pull elements, said heat-responsive means adapted to decommission the pull elements automatically in the event of a fire in the vicinity of the vessel, thereby adapting the open valve to spring automatically to closed position.

9. A valve control system for a plurality of compartments adapted to confine bulk liquids, each of said compartments having a normally closed discharge valve communicating therewith for discharging the bulk liquid from the compartments individually, said control system comprising, a respective manual control element connected with each of said valves for opening the same, each of said manual control elements including a rotatable head having an open slot formed therein, and a shiftable selector element extending through said slots and normally locking said rotatable heads in valve closed position, said selector element having a plurality of notches formed therein in keyed relation to said rotatable heads, one for each head, said selector element adapted to be shifted to bring said notches individually into registry with said heads and thereby adapting a selected head to be rotated by said manual control element to valve open position.

10. A valve control system for a plurality of compartments adapted to confine bulk liquids, each of said compartments having a normally closed discharge valve communicating therewith for discharging the bulk liquid from the compartments individually, said control system comprising, a respective manual control element connected with each of said valves for opening the same, each of said manual control elements including a rotatable head having an open slot formed in an endwise portion thereof, said slots normally residing in alignment with one another when the manual valve control elements are in valve closed position, a longitudinally shiftable selector bar, said selector bar having a locking position in which the bar extends through said slots and locks said rotatable heads in said valve closed position, said selector bar having a plurality of notches formed therein in keyed relation to said rotatable heads, one for each head, said selector bar adapted to be shifted to unlocking positions, bringing said notches individually into registry with said heads and thereby adapting a selected head to be rotated by said manual control element to valve open position, and manual means connected to the selector bar for shifting the same from said locking position to said valve unlocking positions adapting the manual control element to shift the selected valve to open position.

11. A valve control system for a plurality of compartments adapted to confine bulk liquids, each of said compartments having a normally closed discharge valve communicating therewith for discharging the bulk liquid from the compartments individually, said control system comprising, a respective manual control element connected with each of said valves for opening the same, each of said manual control elements including a rotatable head having an open slot formed therein, a shiftable selector element extending through said slots and normally locking said rotatable heads in valve closed position, said selector element having a plurality of notches formed therein in keyed relation to said rotatable heads, one for each head, said selector element adapted to be shifted to bring said notches individually into registry with said heads and thereby adapting a selected head to be rotated by said manual control element to valve open position, and a manually operated emergency trip mechanism connected in common to said heads and normally residing in an inactive position, said trip mecahnism, upon being shifted to an active position, being adapted to rotate the heads to the valve closed position independently of said manual control elements.

12. A valve control system for a plurality of compartments adapted to confine bulk liquids, each of said compartments having a normally closed discharge valve communicating therewith for discharging the bulk liquid from the compartments individually, said control system comprising, a respective manual control element connected with each of said valves for opening the same, each of said manual control elements including a rotatable head having an open slot formed in an endwise portion thereof, said slots normally residing in alignment with one another when the manual valve control elements are in valve closed position, a longitudinally shiftable selector bar, said selector bar having a locking position in which the bar extends through said slots and locks said rotatable heads in said valve closed position, said selector bar having a plurality of notches formed therein in keyed relation to said rotatable heads, one for each head, said selector bar adapted to be shifted to unlocking position, bringing said notches individually into registry with said heads and thereby adapting a selected head to be rotated by said manual control element to valve open position, manual means connected to the selector bar for shifting the same from said locking position to said valve unlocking positions adapting the manual control element to shift the selected valve to open position, and an emergency trip mechanism connected in common with said heads and normally residing in an inactive position, said trip mechanism, upon being shifted to an active position, adapted to rotate the heads to a valve closed position independently of the manual control elements.

References Cited by the Examiner
UNITED STATES PATENTS

| | | | |
|---|---|---|---|
| 1,727,207 | 9/1929 | Kramer | 137—76 X |
| 1,985,207 | 12/1934 | Jensen | 137—637.1 X |
| 2,098,682 | 11/1937 | Ward | 137—637.1 |
| 2,144,212 | 1/1939 | Wheaton | 137—75 X |
| 2,185,061 | 12/1939 | Meyers | 137—637.1 |
| 2,463,737 | 3/1949 | Berck | 137—637.1 |
| 2,692,617 | 10/1954 | Jensen | 137—637.1 |

CLARENCE R. GORDON, *Primary Examiner.*